(12) United States Patent
Ozbaysal

(10) Patent No.: US 11,072,044 B2
(45) Date of Patent: *Jul. 27, 2021

(54) SUPERALLOY COMPONENT BRAZE REPAIR WITH ISOSTATIC SOLUTION TREATMENT

(71) Applicant: SIEMENS ENERGY, INC., Orlando, FL (US)

(72) Inventor: Kazim Ozbaysal, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1060 days.

This patent is subject to a terminal disclaimer.

(21) Appl. No.: 14/251,691

(22) Filed: Apr. 14, 2014

(65) Prior Publication Data
US 2016/0175998 A1 Jun. 23, 2016

(51) Int. Cl.
| | |
|---|---|
| *C21D 1/06* | (2006.01) |
| *B23P 6/04* | (2006.01) |
| *B23K 1/00* | (2006.01) |
| *B23K 35/30* | (2006.01) |
| *C22F 1/10* | (2006.01) |
| *B23K 35/02* | (2006.01) |
| *C22C 19/05* | (2006.01) |
| *B23K 1/19* | (2006.01) |
| *C21D 9/00* | (2006.01) |
| *C22C 19/00* | (2006.01) |

(52) U.S. Cl.
CPC ............ *B23P 6/045* (2013.01); *B23K 1/0018* (2013.01); *B23K 1/19* (2013.01); *B23K 35/0222* (2013.01); *B23K 35/304* (2013.01); *B23K 35/3033* (2013.01); *C21D 1/06* (2013.01); *C21D 9/0068* (2013.01); *C22C 19/007* (2013.01); *C22C 19/05* (2013.01); *C22C 19/058* (2013.01); *C22F 1/10* (2013.01)

(58) Field of Classification Search
CPC .............................. C22F 1/10; B23K 35/3022
USPC ......................................................... 148/528
See application file for complete search history.

(56) References Cited

U.S. PATENT DOCUMENTS

| | | | | |
|---|---|---|---|---|
| 4,302,256 | A | * | 11/1981 | Kenton .................... C21D 6/00 148/622 |
| 5,123,832 | A | | 6/1992 | Bergman et al. |
| 5,584,948 | A | | 12/1996 | Huron |
| 6,524,409 | B2 | | 2/2003 | Barone et al. |
| 6,673,169 | B1 | | 1/2004 | Peterson, Jr. et al. |
| 9,102,015 | B2 | * | 8/2015 | Kulkarni ............... F01D 11/122 |
| 9,149,881 | B2 | * | 10/2015 | Ito ......................... B23K 1/0018 |
| 2006/0042729 | A1 | | 3/2006 | Kottilingam et al. |

(Continued)

FOREIGN PATENT DOCUMENTS

| | | |
|---|---|---|
| CN | 1726297 A | 1/2006 |
| CN | 101041210 A | 9/2007 |

(Continued)

*Primary Examiner* — Jie Yang

(57) ABSTRACT

A method of braze repair for a superalloy material component. Following a brazing operation on the superalloy material, the component is subjected to an isostatic solution treatment, followed by a rapid cool down to ambient temperature under pressure The conditions of the isostatic solution treatment combined with the cool down at pressure function to both reduce porosity in the component and to solution treat the superalloy material, thereby optimizing superalloy properties without reintroducing porosity in the braze.

11 Claims, 1 Drawing Sheet

(56) References Cited

U.S. PATENT DOCUMENTS

| | | |
|---|---|---|
| 2009/0148337 A1 | 6/2009 | Kim et al. |
| 2010/0038412 A1 | 2/2010 | Huang |
| 2011/0088260 A1 | 4/2011 | Yoshioka et al. |
| 2013/0302647 A1 | 11/2013 | Ozbaysal et al. |
| 2014/0007988 A1 | 1/2014 | Ozbaysal |
| 2015/0375346 A1* | 12/2015 | Kamel .................. F01D 5/288 |
| | | 148/528 |

FOREIGN PATENT DOCUMENTS

| | | |
|---|---|---|
| CN | 101422851 A | 5/2009 |
| CN | 101772585 A | 7/2010 |
| CN | 103052466 A | 4/2013 |
| EP | 1605074 A1 | 12/2005 |
| EP | 1967313 A1 | 9/2008 |
| GB | 2098119 A | 11/1982 |
| JP | 2001055928 A | 2/2001 |

\* cited by examiner

SUPERALLOY COMPONENT BRAZE REPAIR WITH ISOSTATIC SOLUTION TREATMENT

FIELD OF THE INVENTION

This invention relates generally to the field of materials technology, and more particularly, to methods of braze repair of superalloy components

BACKGROUND OF THE INVENTION

Gas turbine engine hot gas path components are typically formed of superalloy materials in order to withstand the high temperature, high stress environment to which they are exposed during operation of the engine The term "superalloy" is used herein as it is commonly used in the art; i e., a highly corrosion and oxidation resistant alloy that exhibits excellent mechanical strength and resistance to creep at high temperatures. Superalloys typically include a high nickel or cobalt content Examples of superalloys include alloys sold under the trademarks and brand names Hastelloy, Inconel alloys (e.g. IN 738, IN 792, IN 939), Rene alloys (e g Rene N5, Rene 80, Rene 142), Haynes alloys, Mar M, CM 247, CM 247 LC, C263, 718, X-750, ECY 768, 282, X45, PWA 1483 and CMSX (e g CMSX-4) single crystal alloys. Such components are very expensive to manufacture, and in spite of their superior material properties, they are prone to various forms of degradation during engine operation. Degraded components are removed from the engine and replaced Depending upon the type and degree of degradation, used components may be refurbished and reused at a cost lower than the cost of a new component The repair of superalloy components typically involves the steps of cleaning the component, removing degraded material including superalloy material and thermal barrier coating material as appropriate, and replacing the removed material. It is also common to subject the component to a solution heat treatment to restore metallurgical properties to approximately those achieved during the original manufacture of the component Solution heat treatment involves heating the component to a temperature sufficiently high and for a sufficient length of time such that a target constituent of the material (e g gamma prime) enters into solid solution, and then cooling the component rapidly to hold that constituent in solution Material additive processes are often required during component repair in order to replace degraded superalloy material that has been removed by erosion during operation or by grinding during the repair. Welding of many of the highest alloy content superalloys is made difficult because of the propensity of these materials to develop weld solidification cracking and strain age cracking. Accordingly, brazing processes are sometimes used instead of welding. While braze materials are weaker and less temperature capable than superalloys, they may be used successfully in regions of a component that are subjected to relatively lower temperature and stress environments. Moreover, boron free braze materials containing hafnium, zirconium and titanium have been developed which provide higher strength levels than traditional boron containing braze materials, thereby expanding the range of applications where brazing options are considered It is known to perform a hot isostatic press (HIP) operation on a superalloy component that has been repaired with a non-boron braze alloy in order to reduce the porosity of the braze joint. Hot isostatic pressing is a process wherein the component is subjected to both high temperature and high gas (typically argon) pressure. The pressure is applied to the component by the gas from all directions (isostatic), which collapses internal porosity through a combination of plastic deformation and creep.

It is also known that a non-boron braze material in a repaired superalloy component will form a considerable amount of porosity if subjected to a solution heat treatment after the HIP operation. FIG. 1 is a photograph of a braze material following HIP processing and solution and age heat treatment showing such porosity as indicated by the arrows. Accordingly, braze repaired superalloy gas turbine components are typically not solution heat treated prior to being returned to service. In order to optimize the strength of the braze repair joint, a penalty in the strength of the superalloy material is accepted Once such current process for the repair of a gas turbine engine blade made of CM 247 material includes the steps of perform braze at 1,220-1,250° C. in vacuum at $10^{-4}$ Torr or better for 12 hours
    gas cool to ambient
    HIP at 1,050-1,200° C. for 2-4 hours at 10-25 ksi
    furnace cool to ambient (near 8 hours)
    primary age at 1,080° C. for 2 hours, fast cool to ambient at 30° C./min
    secondary age at 980° C. for 20 hours, cool to ambient

BRIEF DESCRIPTION OF THE DRAWINGS

The invention is explained in the following description in view of the drawings that show.

DETAILED DESCRIPTION OF THE INVENTION

Figure 1:
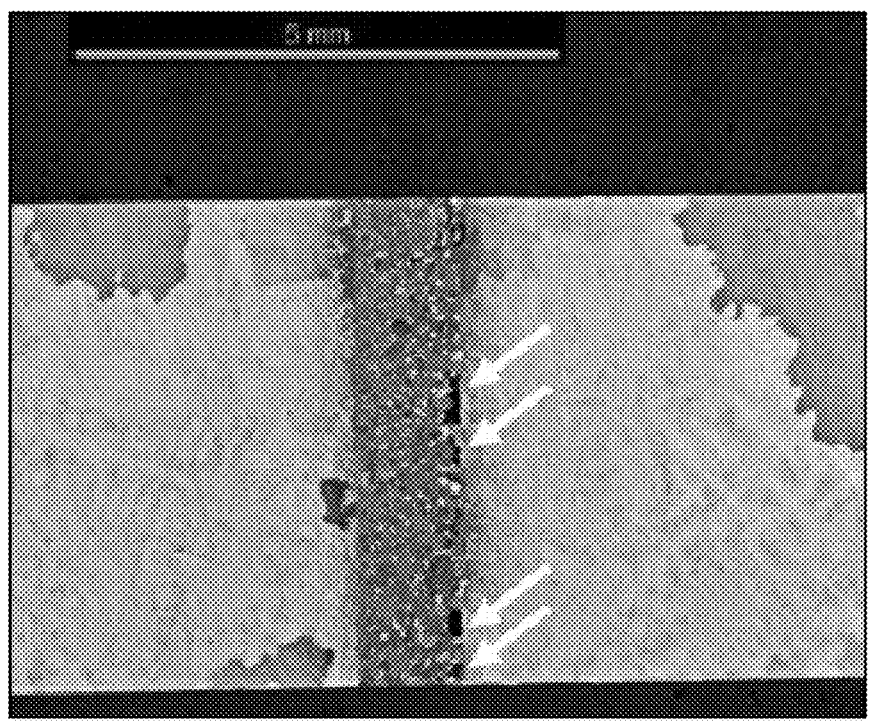
FIG. 1 is a photograph of a braze material following HIP and solution heat treat processing showing the development of porosity as known in the art
Figure 2:
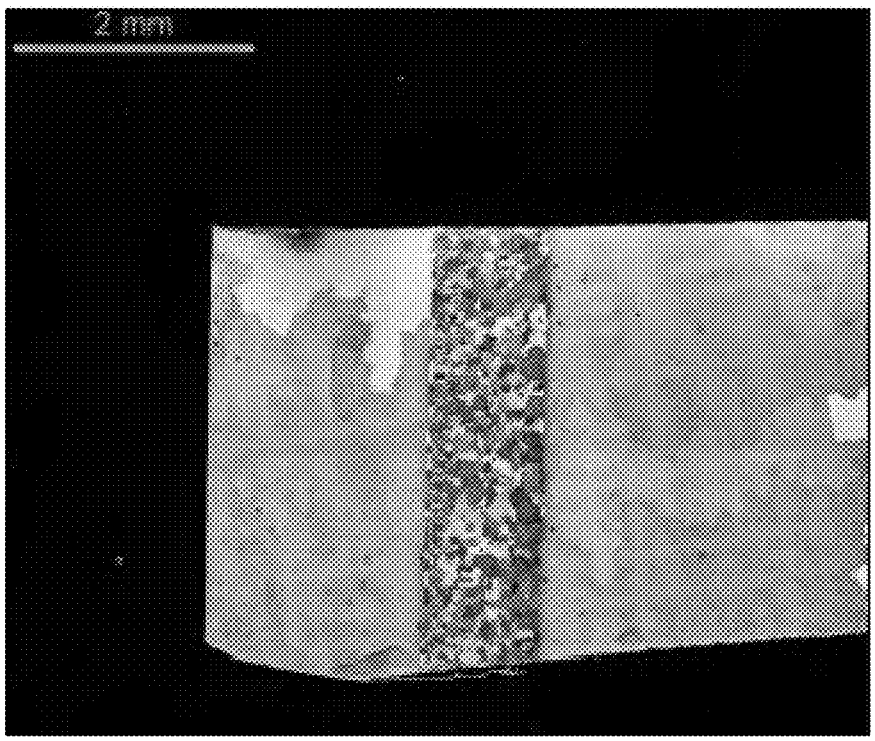
FIG. 2 is a photograph of a braze material processed in accordance with an embodiment of the invention and showing no development of porosity

The present inventor has developed an innovative process for the braze repair of superalloy components which optimizes the strength of the braze joint without sacrificing the strength of the superalloy material The invention combines the porosity reducing function of a hot isostatic pressing operation with the strength restoring function of a solution heat treatment into a single isostatic solution treatment process. Essentially, a solution heat treatment and a hot isostatic pressing process are performed simultaneously, then the component is fast cooled to ambient temperature while maintaining a pressure above ambient, and the pressure is not returned to ambient pressure until after returning the component temperature to ambient temperature. Aging treatment may then optionally be applied An embodiment of the invention may be used for the repair of a CM 247 gas turbine engine blade as follows'
    perform braze at 1,220-1,250° C. in vacuum for 12 hours;
    gas cool to ambient,
    isostatic solution treat at below the braze temperature and between 1,220-1,235° C. for 2-4 hours at 10-25 ksi;
    fast argon cool (40-65° C./min) to ambient (12-30 minutes) while maintaining at 10-25 ksi,
    release pressure at ambient;
    primary age at 1,080° C. for 2 hours, fast cool to ambient at 30° C./min,
    secondary age at 980° C. for 20 hours, cool to ambient The isostatic solution treatment achieves the temperature, pressure and time duration sufficient to function as a hot isostatic pressing operation to collapse porosity in the braze material. The time-at-temperature regiment followed by the rapid cool down also functions as a solution treatment for the superalloy material, which for CM 247 material typically requires a temperature of 1,232° C. for 2 hours Moreover, because the rapid cool down is conducted at an elevated pressure, the material properties of the superalloy material are restored without the redevelopment of porosity in the braze material as was problematic in the prior art. The exemplary braze joint of FIG. 2 processed in accordance with an embodiment of the invention shows no development of porosity.

The innovation described herein is particularly advantageous when used with high strength boron free braze materials which can exhibit strength levels in excess of 80% of superalloy material strength levels While braze material strength was traditionally limiting, and the prior art tradeoff of higher braze joint strength at the cost of lower superalloy strength was appropriate, the present inventor has looked forward to the higher strength titanium based braze materials currently being developed, where the penalty of reduced superalloy strength can become limiting depending upon the location of the braze joint within the component The present innovation prevents the superalloy material from becoming limiting in some repair applications, thereby expanding the universe of commercially practical repairs of superalloy components In an embodiment, a superalloy gas turbine engine component repair or fabrication includes.
- apply braze material to superalloy material at a brazing temperature,
- cool to below the brazing temperature (optionally to ambient),
- at elevated pressure (for example 10-25 ksi argon), hold for a sufficient time (for example 2-4 hours) at a temperature below the brazing temperature but sufficiently high (considering the elevated pressure and hold time) to function as a hot isostatic pressing operation to reduce porosity in the component and to place a target constituent of the superalloy material into solid solution,
- at elevated pressure, rapid cool (at least 25° C./min, or for example 30-65° C./min.) to ambient temperature,
- reduce pressure to ambient While the prior art process of subjecting a brazed superalloy component to a HIP process followed by a solution treatment might typically yield only 10% acceptable parts due to excessive porosity, and while the prior art process of eliminating the solution treatment might typically yield from 30-50% acceptable parts but with a strength penalty in the superalloy material, the present invention has demonstrated greater than 80% acceptable parts with no superalloy material strength penalty.

The present inventor has developed several boron and silicon free braze alloys utilizing titanium as a melting point depressant material, including those disclosed in co-pending United States patent application publication numbers US 2013/0302647 A1 and US 2014/0007988 A1, incorporated by reference herein Embodiments of the invention may be used with those and other boron free braze materials having compositions including or consisting essentially of the following (all compositions herein cited as weight percent).
- A) 15-25% Cr; 15-25% Ti, balance Ni;
- B) 15-25% Cr, 15-25% Zr; balance Ni,
- C) 15-25% Cr, 15-25% Hf; balance Ni;
- D) 3.5-25% Cr; 17-37% (Ti+Zr+Hf), balance Ni The composition D) above includes the various combinations of two or three of the group of titanium, zirconium and hafnium with a total concentration from the group of 17-37% Embodiments of the invention using compositions of A-D) may be brazed at temperatures of between 1,100-1,250° C., and then solution heat treated at a temperature below the brazing temperature but generally within the same range of temperatures while held under a pressure of at least 10 ksi, such as 10-20 ksi, and then cooled to ambient room temperature at a cooling rate of a minimum of 25° C./minute before the pressure is returned to ambient pressure While various embodiments of the present invention have been shown and described herein, it will be obvious that such embodiments are provided by way of example only Numerous variations, changes and substitutions may be made without departing from the invention herein. Accordingly, it is intended that the invention be limited only by the spirit and scope of the appended claims

The invention claimed is:

1. A method of repairing a gas turbine blade comprising:
   applying a boron free braze material to a superalloy component at a brazing temperature of 1,100-1,250° C. in vacuum;
   performing a solution heat treatment and a hot isostatic pressing process simultaneously on the component at below the brazing temperature for 2-4 hours at a pressure of 10-25 ksi;
   fast cooling the component at a minimum of 25° C./min to ambient while maintaining the pressure of 10-25 ksi; and
   releasing the pressure to ambient.

2. The method of claim 1, further comprising applying the braze material consisting essentially of 15-25% Cr; 15-25% Ti; balance Ni, in weight percent.

3. The method of claim 1, further comprising applying the braze material consisting essentially of 15-25% Cr; 15-25% Zr; balance Ni, in weight percent.

4. The method of claim 1, further comprising applying the braze material consisting essentially of 15-25% Cr; 15-25% Hf; balance Ni, in weight percent.

5. The method of claim 1, further comprising applying the braze material consisting essentially of 3.5-25% Cr; 17-37% (Ti+Zr+Hf); balance Ni, in weight percent.

6. The method of claim 1, further comprising:
   primary age treating the component at 1,080° C. for 2 hours, then fast cooling the component to ambient at 30° C./min; and
   secondary age treating the component at 980° C. for 20 hours, then cooling to ambient.

7. In a method of applying braze material to a superalloy material, an improvement comprising:
   performing a solution heat treatment and a hot isostatic pressing process simultaneously at a pressure of 10-25 ksi; then
   rapidly cooling at a minimum of 25° C./min to ambient temperature while maintaining the pressure of 10-25 ksi; and
   returning the pressure to ambient pressure after returning to ambient temperature.

8. In the method of claim 7, the braze material comprising 15-25% Cr; 15-25% Ti; balance Ni, in weight percent.

9. In the method of claim 7, the braze material comprising 15-25% Cr; 15-25% Zr; balance Ni, in weight percent.

10. In the method of claim 7, the braze material comprising 15-25% Cr; 15-25% Hf; balance Ni, in weight percent.

11. In the method of claim 7, the braze material comprising 3.5-25% Cr; 17-37% (Ti+Zr+Hf); balance Ni, in weight percent.

* * * * *